Patented June 16, 1936

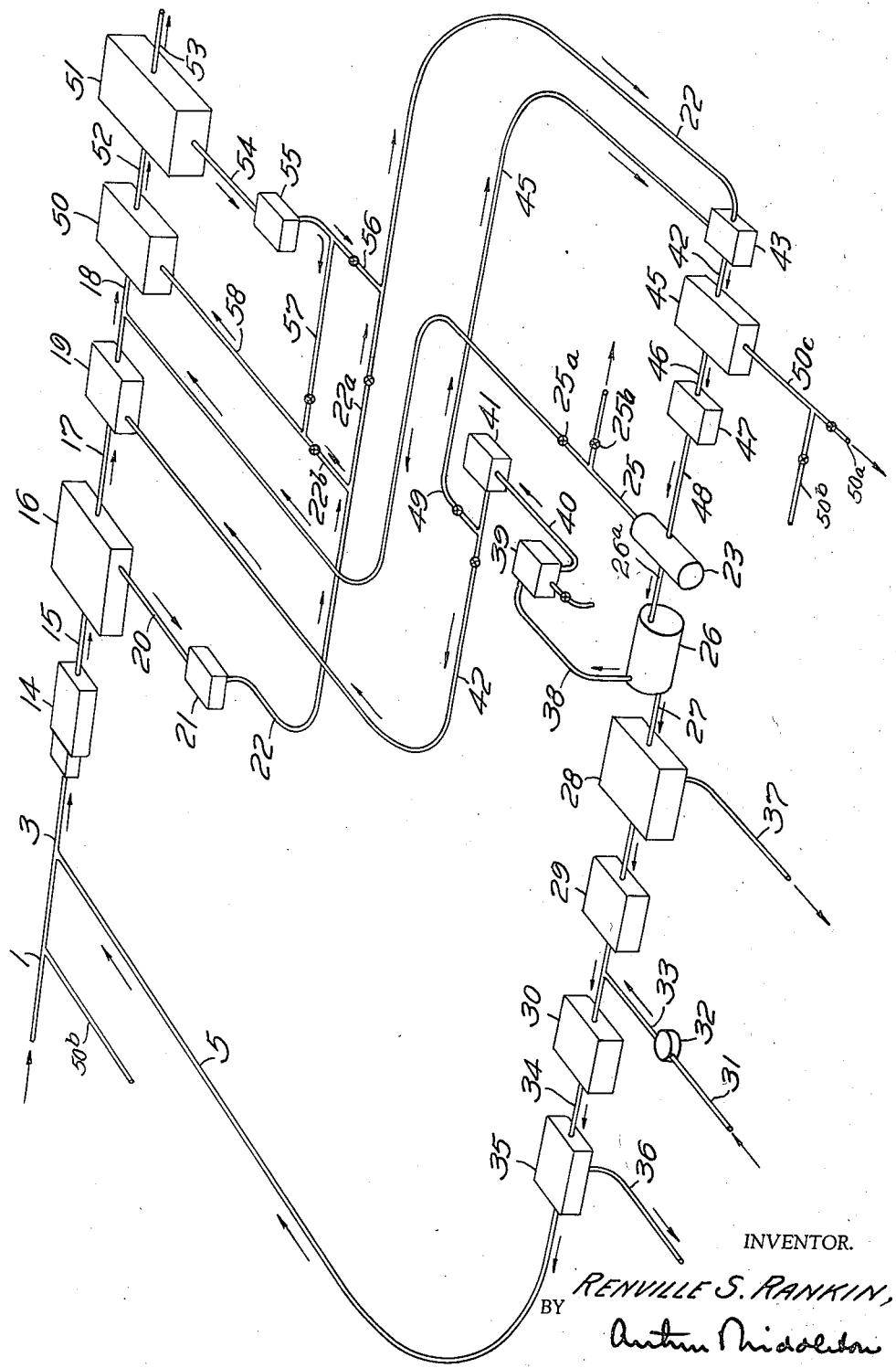

2,044,583

UNITED STATES PATENT OFFICE 2,044,583

WATER SOFTENING

Renville S. Rankin, Hastings, N. Y., assignor to The Dorr Company, Inc., New York, N. Y., a corporation of Delaware Application March 27, 1934, Serial No. 717,568

2 Claims. (Cl. 210—16)

The invention relates to the treatment of impure water particularly to remove, overcome or decrease certain hardness characteristics thereof. In the performing of the invention there will also be realized a substantial elimination of any turbidity existing because of suspended solids therein.

It is well known that the hardness characteristics of certain water is due to the presence therein of calcium or more particularly certain compounds thereof, typified for example by calcium in the form of calcium bicarbonate—$Ca(HCO_3)_2$—and magnesium or more particularly certain compounds thereof typified for example by magnesium in the form of magnesium bicarbonate—$Mg(HCO_3)_2$.

The present invention particularly relates to a method for the treating of water having substantial calcium and magnesium hardness characteristics.

One object of the invention is to provide a lime, calcium oxide—CaO—, water-softening treatment or process of such a character, and to carry out the process in such a manner, that after the process has once been started a supply of lime can be derived therefrom sufficient to at least provide a substantial portion of the lime required for the ultimate carrying out of the water treatment process, generally an amount sufficient to provide all the lime required for the process, and in certain instances an amount sufficient to provide not only the lime required for the process but also an excess which is available for other use or commercial distribution.

One object of the invention is to provide a method or system according to which the magnesium content, or at least a substantial portion thereof, which is eliminated or removed by or during the water treating process is disposed of in liquid form.

Another object of the invention is to remove certain constitutents of the water that impart hardness characteristics to the water, namely to remove certain calcium constituents and certain magnesium constituents by converting the same into solid form by the use of lime preparatory to sedimentation and by removing of the resulting solids in the form of a sludge and by the thereafter treating of the sludge by carbonation to change certain of the solids of the sludge—to wit, the magnesium content in particular—into liquid whereby after sedimentation or filtering or both the remaining solids which consist primarily of a calcium constituent can be ultimately employed to provide, when calcined, a source of lime for the process.

Certain aspects of the invention according to a more specific realization thereof contemplate the withdrawing and collecting of some of the sludge from a sludge settling or sedimentation operation and the introduction of some of the collected sludge into a carbonated effluent from a sedimentation of water which had been previously dosed with lime, whereby because of the sludge thus introduced the settling out of suspended solids remaining in the effluent after carbonation is furthered or aided.

Other objects, aspects, and features of the invention will become apparent from that which follows.

In the sole figure of the accompanying drawing, which constitutes a part of this specification, there is illustrated a system in and by which the invention may be performed and realized in. The system illustrated is particularly designed and intended for the treatment of water having a magnesium and calcium hardness characteristic.

In said drawing the sole figure thereof diagrammatically illustrates a system in which the water after having been sufficiently dosed with lime—usually lime entirely derived from the process—is subjected to a main sedimentation carried out in such a manner that the precipitable solids settle and are withdrawn along one path while the effluent passes along another path, in which the withdrawn sludge is subjected to carbonation and subsequent sedimentation and filtering under conditions to permit the magnesium content to pass as a liquid with the effluent from said subsequent sedimentation and filtering operation along one set of paths while the solids composed mainly of calcium constituents are passed along another path or so that said solid constituents are ultimately passed to a place where they are calcined to produce quicklime, in which the resulting lime is passed to a storage or recovery space preparatory to employment as the lime essential for the process, in which the effluent from the main sedimentation is subjected to carbonation, in which the carbonated effluent is passed to and into a mixing device and therefrom into another or third settling tank or sedimentation chamber, and in which there is a passing of sludge from one of the sedimentation chambers—preferably from the third sedimentation chamber—to the mixing device just mentioned whereby the sludge thus passed to said mixing device is mixed with the carbonated effluent passing therethrough and can serve to aid or further the sedimentation carried out in the third sedimentation tank.

Reference will now be made to the drawing in detail. Like functioning parts are referred to by like reference characters through the specification and on the drawing.

It has heretofore been pointed out that the present invention is directed to the treating of water having a calcium hardness characteristic because of the calcium component thereof provided, for example, by calcium bicarbonate—$Ca(HCO_3)_2$—and also having a magnesium hardness characteristic because of the magnesium component thereof provided, for example, by magnesium bicarbonate—$Mg(HCO_3)_2$—.

In the system illustrated water to be treated and having the dual hardness characteristic mentioned is supplied as along the path 1. It flows inwardly or forwardly along the path 1 and the path 3 to a mixing means or mixing and flocculating means 14. To the inflowing water there is introduced lime as lime hydrate. This lime or lime hydrate is supplied along the path 5. A sufficient or intimate mixing of the lime and the water is furthered because of the functioning of the mixing means 14. The lime thus introduced is sufficient for the requirements of the process. From the mixing apparatus or means 14 the limed or dosed water passes along the path 15 into the main settling tank or sedimentation chamber 16 wherein the desired settling out or sedimentation operation is carried out. From this sedimentation chamber 16 the effluent passes along the path provided by path 17, 18, 52 and 53 to sand filters (not shown) and ultimately to the distributing pipes (not shown). On its way through the paths or pipes 17, 18, 52 and 53 the effluent is subjected to carbonation and other treatment within suitable apparatus indicated by carbonation means 19, by mixing device 50 and by a sedimentation chamber 51, sometimes herein referred to as the third sedimentation chamber. The carbonation means 19 is for insuring the conversion of any calcium or magnesium compounds that are in the effluent into the soluble compounds (to wit, as into bicarbonates), thus insuring the avoiding of any objectionable deposits of either calcium or magnesium compounds either in the sand filters or in the distributing pipes. The functioning of said carbonation means 19, of the mixing device 50 and of the sedimentation chamber 51 as a set will hereafter be more fully described.

The sludge settling out, as a result of the sedimentation carried out in the main settling tank 16, is conveyed in any suitable manner as through pipe 20, sludge pump 21 and pipe 22 to a carbonation or carbonating apparatus 43, thence along the path 42 into a subsequent settling tank or subsequent sedimentation chamber 45 arranged so that the effluent or overflow thereof can pass along path 50c and thence to waste as along the valve controlled path 50a or back into the water supply system through the valve controlled path 50b. The arrangement is also such that the settled sludge can be passed as through the pipe 46 to sludge pump 47 and pipe 48 to the vacuum filter 23 from which the solid content or filter cake is passed as along the path 26a to the kiln 26. The liquid or effluent from the filter 23, which is preferably a vacuum type of filter, is passed as along the path or valve controlled pipe 25 through branch 25a to the pipe 18 or through the valve controlled branch 25b to waste. After suitable calcining in the kiln 26 the resulting product composed largely of calcium oxide or quicklime is passed along path 27 to the lime storage 28. A lime feeder 29, and a water supply means that includes pipe 31, water meter 32, and pipe 33 respectively deliver lime and water to the slaker 30 wherein the quicklime thus supplied is slaked to produce lime hydrate which is delivered from the slaker along the path 34 into the classifier 35—which may be a classifier of the Dorr type. This classifier 35 is relied upon to eliminate grit and unburned material from the lime and to discharge the eliminated grit along one path, as 36, to waste while allowing the lime hydrate which has been freed from the grit and the like to pass to and thence along the path 5 for mixing with the inflowing water.

When water is treated or softened according to the system of this figure there is intimately mixed therewith, as at 14 or in the vicinity preceding 14, the requisite amount of lime which is provided for the process through the pipe 5. This lime in reacting with the magnesium and with the calcium components results in the production of a certain amount of calcium carbonate—$CaCO_3$—a certain amount of magnesium carbonate—$MgCO_3$—, magnesium hydroxide—$Mg(OH)_2$ and possibly some magnesium oxide—$MgO$. The calcium carbonate—$CaCO_3$—and the magnesium hydroxide—$Mg(OH)_2$ are solids of a precipitable form, and most thereof can be settled out as the result of the sedimentation carried out in the main settling tank or sedimentation chamber 16. A small portion, however, of these solids may pass from the settling chamber with the effluent and the carbonation at 19 is employed to convert these solids so that the chemical compounds thereof become bicarbonates which are soluble and remain in solution in the effluent, thus avoiding subsequent objectionable effects in either the sand filters or the pipes into which the effluent is introduced.

The sludge derived as a result of the sedimentation at 16 or at least most of it is directly pumped to the carbonation apparatus at 43, the latter of which is supplied with carbonic oxide —$CO_2$—from the kiln as by passing the products of combustion from the kiln through pipe 38, scrubber 39, pipe 40, compressor 41, and valve controlled pipe 49 to the carbonation apparatus 43. At this point it will be noted that products of combustion can be passed through the valve controlled pipe 42 to the carbonation apparatus 19 previously described. The carbon dioxide —$CO_2$—of the flue gas which is thus applied to the carbonated apparatus 43 converts the magnesium hydroxide—$Mg(OH)_2$—into magnesium bicarbonate—$Mg(HCO_3)_2$—which is a relatively soluble form of magnesium compound. The carbon dioxide—$CO_2$—has a greater affinity for the magnesium constituent than for the calcium constituent and thereafter magnesium bicarbonate is primarily produced by the carbonation operation. However, a sufficiently continued carbonation operation would convert the calcium carbonates into soluble calcium bicarbonates. The carbonation is not carried out to such an extent that substantial quantities of the calcium is converted in soluble form. The carbonated sludge passes from 43 into the subsequent settler or thickener 45 wherein a sedimentation is carried out in such a manner that the effluent thereof flows along the path 50c and thence to waste along the path 50a with the magnesium content in liquid form therein while much of the calcium content remains as calcium carbonate—$CaCO_3$—in solid form and thus precipitates as a sludge which by means of the sludge pump 47 is passed through the pipes 46 and 48 into the filter 23 wherein a filtering operation is carried out that leaves a filter cake composed largely of calcium carbonate—$CaCO_3$.

From the filter 23 the effluent, which is relatively clear and which has some magnesium bicarbonate—$Mg(HCO_3)_2$—therein, is passed as along the path or pipe 25 and thence through the valve controlled branch 25a to the carbonated water pipe 18 or from the pipe 25 through the valve controlled branch 25b to waste.

The calcium carbonate—$CaCO_3$—or filter cake is passed along the path 26a to kiln 26 wherein upon roasting or calcining the calcium carbonate of the filter cake is converted into calcium oxide—$CaO_3$—or quicklime that is stored at 28. From storage 28 the lime can be passed either to the lime feeder 29, thence to slaker 30 wherein it is hydrated to provide the lime hydrate which is employed in the process after having been classified or freed from grit by the classifier at 35. Any excess lime can be taken from storage along path 37 for other use. If in carrying out the process there is a deficiency of lime such deficiency can be supplied by lime added at storage 28.

Reference is now made to the carbonation means 19, to the mixing device or apparatus 50 and to the sedimentation tank or chamber 51 and to the functioning thereof as a set. From what has preceded it will be noted that the effluent from the main or primary sedimentation chamber 16 passes therefrom along the pipe or path 17 into the carbonation means 19 wherein by the employment of $CO_2$ gas derived from the kiln 26, the effluent is subjected to carbonation which results in the dissolving or placing into the solution of certain of the calcium or magnesium compounds and particularly of the magnesium compounds, whereby there is ultimately avoided any objectionable deposits of calcium or magnesium compounds in the sand filters or in the distributing pipes. Into the pipe 18 leading from the carbonation means to the mixing means, there may or may not be introduced effluent from the filter 23. The mixing device 50 is connected into the system so as to receive sludge passed thereto from one of the sedimentation operations, preferably from the third sedimentation chamber 53, although it is possible to pass to the mixing device some of the sludge from the main sedimentation chamber 16. In the mixing device 50 the sludge passed thereto is intermittently mixed with the carbonated effluent passing through the mixing and this mixing of sludge with the carbonated effluent is relied upon to aid sedimentation which is carried out in the sedimentation chamber or tank 51. The mode of handling sludge that is passed to the mixing device 50 will shortly be referred to in more detail. From the sedimentation tank 51 the effluent passes along the path 53 to the filters or to water distributing pipes while the sludge resulting from the sedimentation carried out in the tank 51 is withdrawn along the path 54 by means of a sludge pump 55 and therefrom some of the sludge can be passed through a valve controlled branch 56 into the pipe 22 while a portion of the sludge can be passed as along the valve controlled branch 57 into a pipe 58 leading to the mixing device 50. The pipe 22 may include a valve controlled section 22a and it may also be provided with a valve controlled branch 22b leading to the pipe 58 whereby if desired some sludge from the settling tank 16 can be supplied to the mixing device 50. In the water leaving the carbonation apparatus 19 there may still remain solid particles in suspension therein that are relatively difficult to settle and to further or aid this settling it is feasible to mix at 50 with the carbonated water supplied through the pipe 18 some sludge, preferably the sludge that is derived from the settling apparatus 51. The arrangement just described however permits the supplying to the mixing apparatus at 50 sludge from the settling apparatus or tank 16 or from the settling tank 51 or from both at the option of the operator. Also at the option of the operator some or all of the sludge from each of these places can be caused to be passed into and along the path 22 to and into the carbonation apparatus at 43 and thence into sedimentation tank 45 whereby solids of the sludge remaining after said carbonation and sedimentation can be subjected to the lime producing operations previously described.

The invention is applicable to the treatment of impure waters, to wit, waters having impurities therein regardless as to whether the impurities in the water are of a character which impose upon the water certain hardness or other objectionable characteristics, or whether the impurities in the water exist because of certain solids—organic or inorganic—in suspension therein, and thereby imparting turbidity to the water or imposing other objectionable characteristics upon the water as, for example, by solids incident to city sewage or to trade or industrial wastes and of which water exists as a major part thereof.

What is claimed is:

1. In the treating of impure water the method which comprises mixing lime with water to convert certain of the soluble constituents thereof into solid form, thereafter subjecting the limed water to sedimentation, subjecting the effluent from the sedimentation to carbonation, thereafter subjecting the carbonated effluent to a second sedimentation, and introducing settled sludge at least some of which is derived from the second of said sedimentations into the liquid after carbonation but prior to the second sedimentation.

2. In the treating of impure water as defined in and by the claim preceding the employing of sludge all of which is derived from the second sedimentation as the sludge which is introduced into the carbonated effluent.

RENVILLE S. RANKIN.